United States Patent [19]
Jabsen

[11] 3,932,216
[45] Jan. 13, 1976

[54] INDUSTRIAL TECHNIQUE
[75] Inventor: Felix S. Jabsen, Lynchburg, Va.
[73] Assignee: The Babcock & Wilcox Company, New York, N.Y.
[22] Filed: Aug. 10, 1973
[21] Appl. No.: 387,429

Related U.S. Application Data
[63] Continuation of Ser. No. 207,255, Dec. 13, 1971, abandoned.

[52] U.S. Cl. .................................................. 176/78
[51] Int. Cl.² .......................................... G21C 3/18
[58] Field of Search ............................... 176/76, 78

[56] References Cited
UNITED STATES PATENTS

| | | | |
|---|---|---|---|
| 3,350,275 | 10/1967 | Venier et al. | 176/76 X |
| 3,389,056 | 6/1968 | Frisch | 176/78 |
| 3,442,763 | 5/1969 | Chetter et al. | 176/76 X |
| 3,607,640 | 9/1971 | Krawiec | 176/78 |

Primary Examiner—Harvey E. Behrend
Attorney, Agent, or Firm—J. M. Maquire, Esq.; J. P. Sinnott, Esq.

[57] ABSTRACT

A typical embodiment of the invention provides an efficient aid in positioning fuel elements in a nuclear reactor core. The corner edges of the peripheral band that binds the fuel element grid structure together, as well as the ends of the individual grid plates that protrude beyond the last marginal rows of fuel rods in each of the fuel elements are chamfered or bevelled. Thus, when fuel elements are being inserted, relocated or withdrawn from a reactor core the sloping edges of the grid structures in adjacent elements slide past without locking together or otherwise undesirably engaging each other.

2 Claims, 4 Drawing Figures

U.S. Patent Jan. 13, 1976 3,932,216
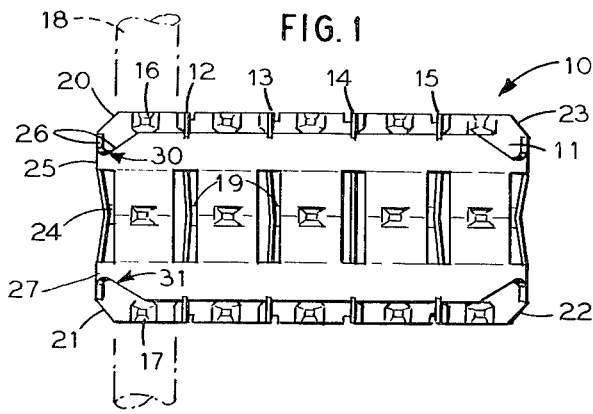
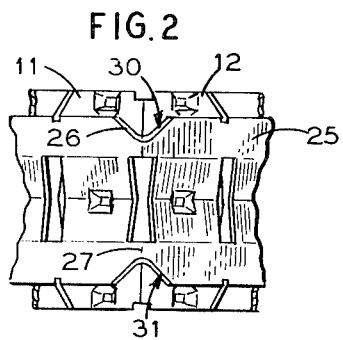
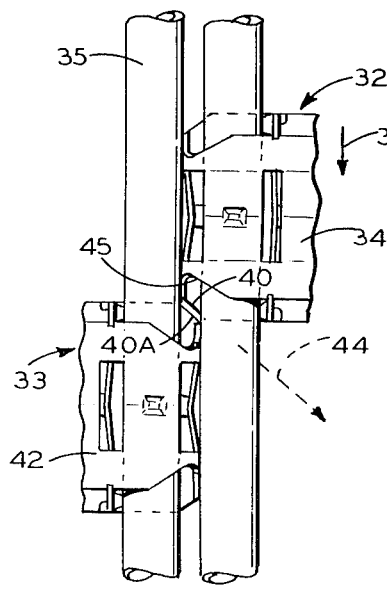
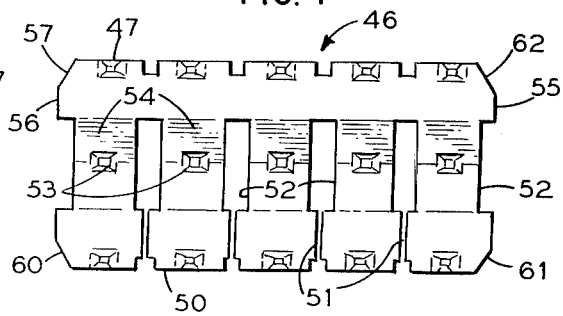

INDUSTRIAL TECHNIQUE

This is a continuation of application Ser. No. 207,255, filed Dec. 13, 1971, now abandoned.

BACKGROUND OF THE INVENTION

1. Field of the Invention

This invention relates to nuclear power systems, and more particularly to grid structures for nuclear reactor fuel elements, and the like.

2. Description of the Prior Art

In order to produce useful nuclear power, a suitable concentration of fissionable material must be assembled in a reactor core under proper conditions. This material, of which the uranium isotope $U^{235}$ is typical, generates power through sustained fission processes. In the usual fission events, neutrons are absorbed in the $U^{235}$ nuclei. These absorptions cause the nuclei, in general, to release energy and to disintegrate into the nuclei of lighter elements. If the processes are to continue, the fissioning nuclei also must produce a new generation of neutrons in an abundance that is sufficient to initiate an equal number of new fissions.

There are many formidable environmental, physical, and economic difficulties that must be overcome in order to build a commercially acceptable nuclear reactor while maintaining this essential neutron balance. For example, in a power reactor that transfers the fission process energy to a flowing stream of pressurized water, the fissionable material is loaded into hollow tubes that are referred to as "fuel rods".

For ease of shipment, installation, and removal, as well as to enhance the structural integrity of the core, these rods usually are grouped together in sub-assemblies that are called "fuel elements". A typical commercial reactor fuel element, for instance, may have an array of more than two hundred of these individual fuel rods.

In an assembled fuel element, the rods usually are separated from each other to provide spaces for coolant water flow in order to remove the heat that is generated in the core. This rod arrangement, moreover, when viewed in cross section, is generally square.

The individual rods are held in their relative positions by means of cellular grid structures that are formed from interlocking plates. The grids, moreover, are spaced from each other at intervals along the length of the array of fuel rods. Each of these fuel rods in the array are lodged in respective cells within each of the grids. Within each of the cells, the respective fuel rods are restrained, or engaged by detents or "stops" that protrude from the plates that form the grid and press against the respective fuel rod surfaces.

These grids, however, conflict with other desirable features of a well-designed reactor core. For instance, to make the most efficient use of the fissionable material charge within a reactor core, pressure losses in the core coolant should be minimized. Further in this regard, because the fuel elements ordinarily are nested closely together in a reactor pressure vessel, it is customary to provide tongues on the bands that form the peripheries of the grid structures. These tongues have portions that jut out from the bands to guide the fuel elements as they are being inserted into or being withdrawn from the reactor pressure vessel. Although these tongues perform a useful function, they nevertheless tend to obstruct the flow path and thereby increase the coolant pressure losses.

These tongues also impose an adverse influence on the neutron balance within the reactor core. In this regard, it should be noted that almost all non-fissionable materials within a reactor core tend to act as "poisons" that absorb neutrons without producing a corresponding generation of neutrons to sustain the fission process. Thus, the tongues increase these parasitical neutron losses within the reactor and thereby decrease the "life" of the core.

The clear desirability of reducing these losses, however, is superseded by the need to insure smooth insertion and withdrawal of the fuel elements from the reactor vessel. This need is further emphasized if it is recognized that during withdrawal, the individual fuel elements probably will have to be handled with remotely operated tools because of dangerously high radioactivity levels. If, for example, two radioactive fuel elements should lock together during withdrawal from the core, the problem of disengaging these elements from each other to complete the withdrawal through some sort of remote manipulation can be time consuming, expensive and possibly dangerous.

One suggested technique proposes welding the grid plates to the fuel rods and eliminating the bands that circumscribe the grid structure. On one side, the ends of the individual plates protrude beyond the fuel element framework and the corners of these protruding plates are tapered. The welded structure, however, can lead to manufacturing, processing and quality control difficulties.

Accordingly, there is a need for some fuel element technique that will aid reactor core assembly and reduce coolant pressure losses and parasitical neutron absorption.

SUMMARY OF THE INVENTION

These inefficiencies and difficulties that have characterized the prior art have been overcome by bevelling or chamfering the edges of the band that encircle the grid structure. In this way, parasitical material that obstructs the coolant flow is removed from the core. This reduction in core material, in accordance with the terms of the invention, increases neutron efficiency within the reactor and reduces reactor coolant pressure losses without imposing the difficulties of a welded fuel rod structure.

More specifically, a typical embodiment of the invention comprises a cellular structure that is formed from an array of generally planar grid plates that interlock with each other at right angles. These interlocking plates form a group of cells, each of which have essentially square cross sections. The grid plates, moreover, have stops or detents that protrude inwardly toward the center of each of the respective cells. These stops press against corresponding portions of the fuel rods that are lodged within the cells in order to secure the rods in their proper respective positions.

The ends of the grid plates protrude slightly beyond the fuel rods that form the border or margin of the assembly. The protruding edges of these plates abut and are welded to a band structure that circumscribes the periphery of the interlocked plates. The band structure enhances the physical integrity of the grid and, being provided with stops that protrude inwardly toward the cell structure, also serves to engage and restrain the fuel rods in the marginal rows.

The corner edges of the protruding plates are trimmed or bevelled to provide a sloping transition that matches the greater width of the grid plates to the lesser width of the peripheral band. These sloping transitions preferably commence within the volume that is defined by the assembled fuel rods, or at the margin that the border rows of these rods establish.

To encircle the interlocked grid plates, the band structure usually has four generally flat sides that meet, forming four corners. In accordance with another feature of the invention, the corner edges of the band structure are chamfered, bevelled, ground down, or otherwise trimmed away to produce vee shaped slots.

These novel structural characteristics of the invention eliminate sharp edges that tend to cause adjacent fuel elements to lock together. The sloping portions and vee-shaped slots provide bearing surfaces that have a camlike action which causes the fuel elements to slide relative to each other without introducing parasitical flow-obstructing materials.

Viewed in a somewhat different context, the invention further includes a member for a fuel element grid that is formed from a generally planar strip. This strip is, of course, one of the plates from which the grid structure is built.

More specifically, opposite sides of the member preferably have longitudinally extending faces that terminate in longitudinal and perpendicular edges. One of the longitudinal edges is intersected by equidistantly spaced slits that connect with individual paddle-shaped cutouts in the middle portion of the strip. To form the stops or detents, indentations that protrude beyond the plane of the strip also are formed in the strip's longitudinal edges and middle portion, approximately midway between the cutouts.

A particularly novel feature of this member is characterized by the manner in which the edges are joined together at the corners of the plate. Sloping surfaces connect each adjacent pair of longitudinal and perpendicular edges, the sloping surfaces intersecting to form obtuse angles with the individual edges. Thus, each grid plate is provided with the cam surfaces or inclined planes that tend to keep adjacent fuel elements from jamming during relative movement within the reactor core.

Clearly, the invention provides a technique that largely overcomes the disadvantages of the prior art without introducing additional material into the core or relying on troublesome welds.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

FIG. 1 is a front elevation of a typical grid structure that embodies features of the invention;

FIG. 2 is a front elevation of one corner of the grid structure shown in FIG. 1;

FIG. 3 is a front elevation of portions of two fuel elements that illustrates a characteristic of the invention; and FIG. 4 is a front elevation of a typical grid plate for use in the embodiment of the invention that is shown in FIG. 1.

DESCRIPTION OF THE PREFERRED EMBODIMENTS

For a more complete appreciation of the invention, attention is invited to FIG. 1, which shows a typical grid structure 10. The grid 10 is formed from a group of equidistantly spaced parallel grid members or plates. In the plane of the drawing, however, only a grid plate 11 is shown.

Almost identical plates 12, 13, 14, and 15 are arranged perpendicularly to the plane of the plate 11. All of the plates in the grid structure 10 have mutually engaging slits (not shown in FIG. 1) that enable the interlocking members to mesh with each other and thus form an array of cells.

Detents or stops 16 and 17 are provided in the longitudinal edges of the plates. These detents engage the adjacent surfaces of the individual fuel rods that are lodged within the cells, as illustrated by the portion of a fuel rod 18 that is shown in broken lines. Detents or stops 19 also are formed in the middle portion of some of the grid plates. These detent-bearing middle portions, moreover, in at least one embodiment of the invention are warped or bowed slightly to add to the depth to which each of these stops protrude in toward the center of a respective cell.

The plates 11 through 15 are joined at the intersections by spot welding, brazing, or the like in order to produce a sturdy rigid structure.

In accordance with the invention, the corners of the grid plate 11 and the plates 12 through 15 are beveled by chamfering, stamping, grinding or the like to provide sloping surfaces 20, 21, 22, and 23. The length of the inclination that characterizes these surfaces should extend at least from the outermost edge of the fuel rod 18 to a band 25 that circumscribes the perimeter of the grid structure 10. As described subsequently in more complete detail, the sloping surfaces 20, 21, 22, and 23 act as cams or inclined planes that aid the relative movement of two adjacent grids.

The band 25 that encircles the grid structure 10 has stops or detents, of which detent 24 is typical, that help to retain the outer or peripheral ranks of fuel rods, exemplified by the fuel rod 18, in the grid structure. The band 25, joined to the terminal edges of the grid plates, also tends to enhance the physical integrity of the grid structure 10.

As shown in the drawing, the band 25 is not as wide as the maximum width of the plates 11 and 12 through 25. The sloping surfaces 20 through 23 thus form transition sections that match the greater width of the grid plates to the lesser width of the band 25.

Because in plan view (not shown), the illustrative embodiment of the grid 10 is generally rectangular, the band 25 forms right angle corners. Further in accordance with the invention, the corner edges are finished by means of sloping portions 26 that meet at a corner crease 27. As shown in FIG. 2, these sloping portions 26 meet to provide generally vee shaped edges 30 and 31, which also function as cams or inclined planes. Generally, the beveled, vee-shaped edges 30 and 31 prevent the corners of adjacent fuel element grid structures from locking together during reactor core assembly or refueling.

In operation, a typical fuel element 32 shown in FIG. 3 is moved in the direction of an arrow 37. Adjacent fuel element 33 is stationary within the reactor core (not shown).

The outer surface of a band 34 on the grid structure for the fuel element 32 is in sliding engagement with a side of the fuel rod 35 that is lodged in the fuel element 33.

The fuel rod 35 tends to guide the band 34 into physical contact with a corresponding portion of band 42 on the fuel element 33. Sloping surfaces 40 and 40A that characterize the plates which form the grid structure engage the adjacent portions of the opposite grid. The sloping character of the surfaces 40 and 40A respond to the movement of the fuel element 32 in the direction of the arrow 37 by forcing the element to shift away from the fuel rod 35, in the direction shown by an arrow 44. Thus, the sloping surfaces 40 and 40A act as cams or inclined planes that ease the fuel element 32 into proper relative alignment in which the bands 34 and 42 abut.

Although not shown in the drawing, in a similar manner, a vee shaped edge 45, formed at the corner of the band 34, guides the fuel element 32 past the fuel element 33, because the edge 45 prevents corner edges of the grids from becoming temporarily engaged or locked together.

An additional feature of the invention resides in the physical structure of the individual grid plates. Turning to FIG. 4 of the drawing, for instance, a generally planar grid plate 46 has parallel longitudinal edges 47 and 50. The edge 50, moreover, is interrupted at regular intervals by slits 51 that terminate in paddle shaped cut-outs 52, which are formed in the mid-portion of the plate 46. As described in more complete detail in F. S. Jabsen U.S. patent application Ser. No. 774,148, filed Nov. 7, 1968, now U.S. Pat. No. 3,665,586; Ser. No. 105,388, filed Jan. 11, 1971; and Ser. No. 193,383, filed Oct. 28, 1971, now U.S. Pat. No. 3,795,040, all assigned to the assignee of the instant invention, the slits 51 enable the grid plate 46 to mesh with other grid plates (not shown in FIG. 4) that are perpendicularly oriented relative to the plane of the drawing. This meshed arrangement establishes the desired cellular structure. Also as described in the foregoing applications for patent, keys (not shown) are inserted into the cellular structure in order to force protruding detents away from the center of the respective cells. This temporary deflection provides a sufficient clearance for fuel rods (not shown in FIG. 4) to pass through the cell structure without being scored, abraded, or gouged by the stops of which detents 53 are typical. After the fuel rods have been lodged within the respective cells, the keys are withdrawn from the cell structure and the detents 53 engage the rod surfaces.

As shown in FIG. 4, the detents 53 are formed in bent or warped portions 54 of the plate 46. This is a characteristic of the embodiment shown in the drawing that is not essential, however, to the practice of the invention. The detents 53, for example, can be provided on a flat surface that has not been warped. The detents, moreover, in the mid-portions of at least some of the plates can be omitted, as shown in connection with the plate 14 in FIG. 1 of the drawing.

The plate 46 terminates in two parallel transverse edges 55 and 56. In accordance with a feature of the invention, the longitudinal edges 47 and 50 are joined to the adjacent segments of the transverse edges by means of sloping surfaces 57, 60, 61, and 62. These sloping surfaces form obtuse angles with the respective adjacent transverse and longitudinal edges. The relationship between these surfaces and edges provides the inclined planes or cam surfaces that facilitate reactor core assembly and disassembly in the manner that was described in connection with FIG. 3.

Considered from another viewpoint, the longitudinal distance that the sloping surfaces 57 and 60 can extend away from the adjacent transverse edge should be about equal to the distance to which the detents protrude into the cell structure (not shown in FIG. 4). This distance is typified by the height to which the detents 53 extend above the warped portions 54 of the plate 46. With this generalization as a guide, there is an assurance that no sharp angles or edges on the plate 46 will protrude beyond the outer rank of fuel rods in a given fuel element.

Accordingly, the invention is a simple and efficient technique that enables the nuclear reactor cores to be assembled, rearranged and disassembled without incurring the penalties that have characterized the prior art.

What is claimed is:

1. A cellular grid structure for a fuel element comprising band means of generally uniform width and circumscribing the grid structure, said band means having an inner surface that engages the grid structure and an outer surface, said band means surfaces terminating in at least one generally flat surface, detents on said band means that protrude toward the cellular structure, a plurality of generally parallel flat grid plates each having transverse ends that abut said band means inner surface and having widths that are greater than said band means width, and a further plurality of generally flat grid plates having transverse ends that abut said band means inner surface and having widths that are greater than said band means width, said further plate plurality interlocking with said plurality of plates to form the cellular grid structure, the abutting edges of said interlocking plates having sloping surfaces that match the widths of said plates to the width of said band means, said sloping surfaces extending from said outer surface of said band means and across said generally flat band means surface in order to prevent an adjacent cellular grid structure from locking with said band means and said grid plates, said sloping surface extending toward the cellular structure for a distance that is approximately equal to the inward protrusion of said detents, and said band means further forming a generally rectangular structure circumscribing said interlocking plates and having vee-shaped corner edges formed thereon.

2. A fuel element comprising a plurality of fuel rods each of said rods being in spaced relation, a cellular grid structure having detents that protrude into said cells to engage each of said spaced fuel rods and sustain said relation, a band that circumscribes said grid structure said band having an outer surface and having an inner surface in which said inner surface engages at least some of the fuel elements and said grid structure, said band means surfaces both terminating in at least one common generally flat surface, said band having a width that is generally less than the width of said grid structure, said grid structure having sloping portions that protrude beyond said fuel rods to match the width of said grid to the width of said band, said sloping portions extending from said outer band surface and across said flat surface in order to prevent another adjacent fuel element from locking with said cellular grid structure said band further having a plurality of detents protruding toward said structural cells and said sloping portions of said grid structure extending from said band toward said structural cells for a distance that is at least equal to said detent protrusion.

* * * * *